(12) United States Patent
Kim

(10) Patent No.: US 12,469,897 B2
(45) Date of Patent: Nov. 11, 2025

(54) BATTERY MANAGEMENT APPARATUS

(71) Applicant: LG ENERGY SOLUTION, LTD., Seoul (KR)

(72) Inventor: Young-Joong Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 581 days.

(21) Appl. No.: 18/007,653

(22) PCT Filed: Jul. 14, 2021

(86) PCT No.: PCT/KR2021/009069
§ 371 (c)(1),
(2) Date: Dec. 1, 2022

(87) PCT Pub. No.: WO2022/015065
PCT Pub. Date: Jan. 20, 2022

(65) Prior Publication Data
US 2023/0299377 A1  Sep. 21, 2023

(30) Foreign Application Priority Data
Jul. 17, 2020 (KR) .................. 10-2020-0089136

(51) Int. Cl.
H02J 7/00 (2006.01)
H01M 10/615 (2014.01)
H01M 10/637 (2014.01)

(52) U.S. Cl.
CPC ....... *H01M 10/637* (2015.04); *H01M 10/615* (2015.04)

(58) Field of Classification Search
None
See application file for complete search history.

(56) References Cited

U.S. PATENT DOCUMENTS 6,057,671 A    5/2000 Kuno
10,044,069 B2  8/2018 Despesse
(Continued)

FOREIGN PATENT DOCUMENTS

CN    103419614 A    12/2013
CN    103503223 A    1/2014
(Continued)

OTHER PUBLICATIONS

Office Action dated Jan. 4, 2025 issued in corresponding Chinese Patent Application No. 202180023565.X. (Note: WO 2019/208183 A1, US 2008/0116851 A1, US 2015/0239405 A1, KR 10-2020-0058996 A cited in this CN Office Action were cited in prior IDSs.).
(Continued)

*Primary Examiner* — Arun C Williams
(74) *Attorney, Agent, or Firm* — Morgan, Lewis & Bockius LLP

(57) ABSTRACT

A battery management apparatus according to an embodiment of the present disclosure may manage a battery in consideration of mobility of lithium ions according to a temperature of the battery, and the present disclosure is directed to providing a battery management apparatus that may increase the temperature of a battery without control by a processing module when the temperature of the battery is lowered below a specific temperature. According to one aspect of the present disclosure, in an emergency situation when the temperature of the battery drops below a certain temperature, there is an advantage of allowing the battery to operate normally by heating the heating element to increase the temperature of the battery without going through a systemic process.

12 Claims, 4 Drawing Sheets

(56) References Cited

U.S. PATENT DOCUMENTS

| | | | |
|---|---|---|---|
| 2005/0017690 A1* | 1/2005 | Kamenoff | H02J 7/007194 |
| | | | 320/150 |
| 2008/0116851 A1* | 5/2008 | Mori | H02J 7/00302 |
| | | | 320/136 |
| 2009/0020346 A1 | 1/2009 | Krauer et al. | |
| 2009/0058370 A1* | 3/2009 | Odaohhara | H01M 10/443 |
| | | | 320/152 |
| 2009/0160405 A1* | 6/2009 | Takeda | H02J 7/0031 |
| | | | 320/152 |
| 2009/0295334 A1* | 12/2009 | Yang | H02J 7/007182 |
| | | | 320/152 |
| 2013/0181681 A1* | 7/2013 | Mukai | H02J 7/0013 |
| | | | 320/128 |
| 2014/0087215 A1 | 3/2014 | Kim | |
| 2015/0166045 A1 | 6/2015 | Chen et al. | |
| 2015/0239405 A1 | 8/2015 | Kaihara et al. | |
| 2016/0043447 A1 | 2/2016 | Peh et al. | |
| 2019/0067761 A1 | 2/2019 | Catolico et al. | |
| 2021/0135481 A1 | 5/2021 | Sugisawa | |
| 2021/0218085 A1* | 7/2021 | Ge | H01M 10/486 |

FOREIGN PATENT DOCUMENTS

| | | |
|---|---|---|
| CN | 108701882 A | 10/2018 |
| CN | 110828852 A | 2/2020 |
| JP | 2000-040536 A | 2/2000 |
| JP | 2002-075469 A | 3/2002 |
| JP | 3265570 B2 | 3/2002 |
| JP | 2006-156024 A | 6/2006 |
| JP | 3905219 B2 | 4/2007 |
| JP | 2010-022151 A | 1/2010 |
| JP | 2017-143691 A | 8/2017 |
| JP | 2019-193500 A | 10/2019 |
| KR | 10-2007-0108754 A | 11/2007 |
| KR | 10-2014-0040612 A | 4/2014 |
| KR | 10-2018-0121723 A | 11/2018 |
| KR | 10-2019-0135077 A | 12/2019 |
| KR | 10-2020-0058996 A | 5/2020 |
| TW | 200518370 A | 6/2005 |
| WO | 2006/112501 A1 | 10/2006 |
| WO | 2009/012038 A1 | 1/2009 |
| WO | 2019/208183 A1 | 10/2019 |

OTHER PUBLICATIONS

Office Action dated Mar. 4, 2025, issued in corresponding Taiwanese Patent Application No. 110126246. (Note: WO 2019/208183 A1 cited in this TW Office Action was cited in a prior IDS.).
Extended European Search Report issued Dec. 12, 2023 for European Patent Application No. 21843461.1 (Note: KR 2020-0058996 A was cited in a prior IDS.).
International Search Report (with partial translation) and Written Opinion dated Oct. 25, 2021, for corresponding International Patent Application No. PCT/KR2021/009069.

* cited by examiner

BATTERY MANAGEMENT APPARATUS

TECHNICAL FIELD

The present application claims priority to Korean Patent Application No. 10-2020-0089136 filed on Jul. 17, 2020 in the Republic of Korea, the disclosures of which are incorporated herein by reference in their entirety.

The present disclosure relates to a battery management apparatus, and more particularly, to a battery management apparatus capable of managing a battery in consideration of mobility of lithium ions according to a temperature of the battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Such a battery may be charged or discharged as lithium ions move from a positive electrode to a negative electrode or from the negative electrode to the positive electrode through an electrolyte. That is, the battery is charged or discharged by the movement of lithium ions. Here, if the temperature of the battery is lowered to a specific temperature or below, the electrolyte may be frozen to significantly reduce the mobility of the lithium ions. For example, if the temperature of the battery is lowered to −40° C. or below, the mobility of the lithium ions may be significantly reduced so that the battery may not be charged or discharged.

Therefore, in order to solve this problem, conventionally, a technology for driving a heater to maintain the temperature of the battery at an appropriate temperature when the temperature of the battery reaches a critical temperature has been developed (Patent Literature 1).

Specifically, Patent Literature 1 discloses a battery system that measures a temperature of a lithium battery with a temperature sensor, controls an operation state of a switch to a turn-on state to supply power to a battery heater when the temperature of the lithium battery is equal to or lower than a first critical temperature, and controls the operation state of the switch to a turn-off state to block power supplied to the battery heater when the temperature of the lithium battery is equal to or higher than a second critical temperature.

However, the battery system of Patent Literature 1 compares the temperature of the lithium battery with the first critical temperature and the second critical temperature through a control unit (a processing module) and directly controls the operation state of the switch according to the comparison result. If the battery system is continuously exposed to a low temperature in a state where the power is turned off so that the internal temperature of the battery system is out of an appropriate temperature range in which the control unit may operate, the control unit may not operate normally. In this case, there is a problem that the temperature of the battery and the first critical temperature cannot be compared and also the operation state of the switch cannot be controlled.

Therefore, it is necessary to develop a technology that may automatically increase the temperature of the battery without using a processing module when the temperature of the battery is lowered below a certain temperature.

DISCLOSURE

Technical Problem

The present disclosure is designed to solve the problems of the related art, and therefore the present disclosure is directed to providing a battery management apparatus that may increase the temperature of a battery without control by a processing module when the temperature of the battery is lowered below a specific temperature.

These and other objects and advantages of the present disclosure may be understood from the following detailed description and will become more fully apparent from example embodiments of the present disclosure. Also, it will be easily understood that the objects and advantages of the present disclosure may be realized by the means shown in the appended claims and combinations thereof.

Technical Solution

In one aspect of the present disclosure, there is provided a battery management apparatus, comprising: a heating cell configured to be connected to a battery in parallel; a first switch connected between the heating cell and a charging and discharging path on which a current for charging and discharging the battery flows and configured to open and close a path between the charging and discharging path and the heating cell according to an operation state; a heating element connected to the heating cell in parallel and configured to increase a temperature of the battery by generating heat when a current is supplied from the heating cell; a second switch connected between the heating element and the heating cell and configured to open and close a path connected to the heating element and the heating cell according to an operation state; and a heating control unit respectively connected to the first switch and the second switch, connected between the battery and the first switch to receive a voltage of the battery, and configured to respectively control the operation states of the first switch and the second switch according to the input voltage.

The heating control unit may be configured to control the operation states of the first switch and the second switch differently.

The heating control unit may be configured to generate a control signal corresponding to the input voltage, generate an inversion signal of the control signal, output the control signal to the first switch, and output the inversion signal to the second switch.

The heating element may be configured to generate heat by the current supplied from the heating cell when the operation state of the first switch is controlled to a turn-off state and the operation state of the second switch is controlled to a turn-on state by the heating control unit.

The battery management apparatus according to another aspect of the present disclosure may further comprise a signal delay unit provided to a path on which the inversion signal passes between the heating control unit and the second switch and configured to delay a time at which the inversion signal is input to the second switch.

The inversion signal may be configured to be input to the second switch after the control signal is input to the first switch.

The signal delay unit may include a resistor configured to be connected between the heating control unit and the second switch; and a capacitor configured to have one end connected between the resistor and the second switch and the other end connected to the ground.

The heating control unit may include a buffer configured to receive the voltage of the battery through an input terminal thereof, generate a control signal having the same magnitude as the input voltage, and output the generated control signal through an output terminal thereof; and an inverter connected to the output terminal of the buffer to receive the control signal and configured to generate the inversion signal for the input control signal and output the generated inversion signal to the second switch.

The heating control unit may include a comparator configured to receive the voltage of the battery through a first input terminal thereof, receive a reference voltage through a second input terminal thereof, compare magnitudes of the voltage of the battery and the reference voltage to generate a high level signal or a low level signal having different signal levels as the control signal, and output the generated control signal through an output terminal thereof; and an inverter connected to the output terminal of the comparator to receive the control signal and configured to generate the inversion signal for the input control signal and output the generated inversion signal to the second switch.

A battery pack according to another aspect of the present disclosure may comprise the battery management apparatus according to an aspect of the present disclosure.

Advantageous Effects

According to one aspect of the present disclosure, in an emergency situation when the temperature of the battery drops below a certain temperature, there is an advantage of allowing the battery to operate normally by heating the heating element to increase the temperature of the battery without going through a systemic process.

In addition, according to one aspect of the present disclosure, since energy required when the heating element is heated may be supplied from the heating cell, there is an advantage in that the energy of the battery is not consumed to heat the heating element.

The effects of the present disclosure are not limited to the effects mentioned above, and other effects not mentioned will be clearly understood by those skilled in the art from the description of the claims.

BRIEF DESCRIPTION OF DRAWINGS

The accompanying drawings illustrate embodiments of the present disclosure and together with the foregoing disclosure, serve to provide further understanding of the technical features of the present disclosure, and thus, the present disclosure is not construed as being limited to the drawings.

MODES OF PRACTICING THE DISCLOSURE

It should be understood that the terms used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
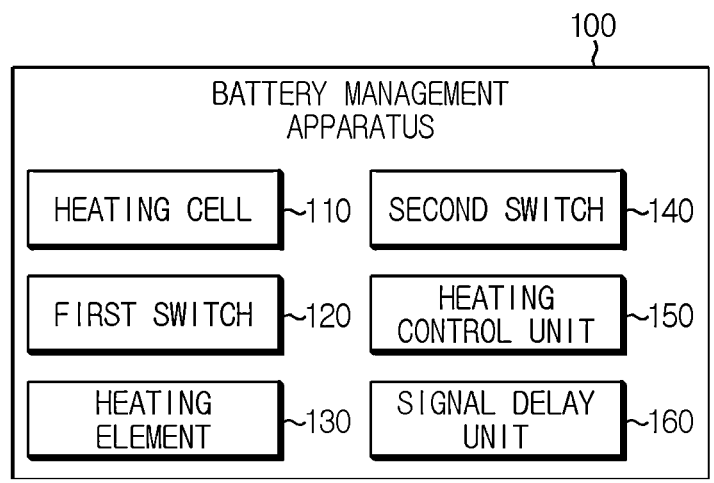
FIG. 1 is a diagram schematically showing a battery management apparatus according to an embodiment of the present disclosure.
Figure 2:
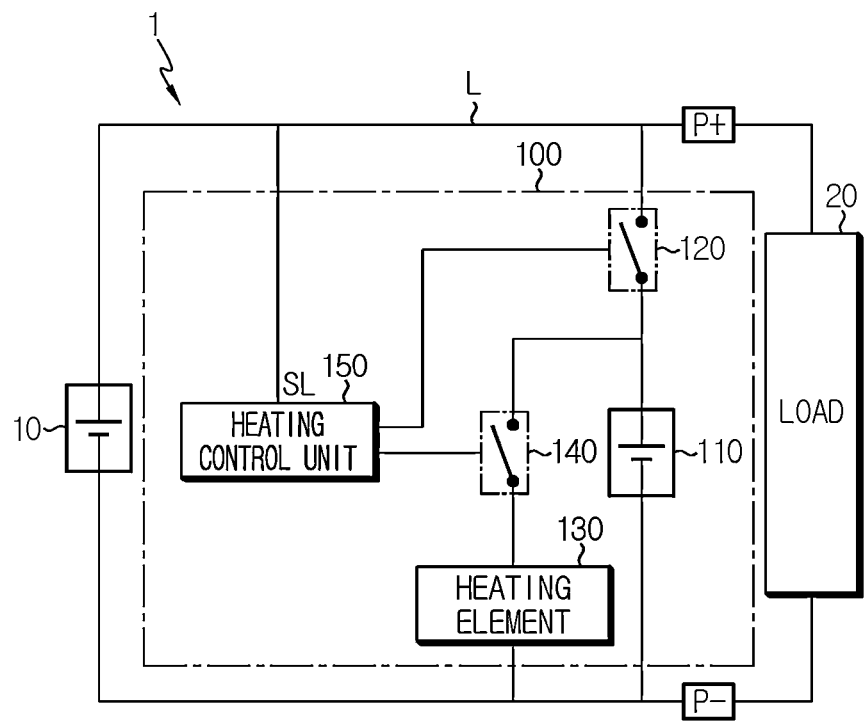
FIG. 2 is a diagram schematically showing an example configuration of a battery pack including the battery management apparatus according to an embodiment of the present disclosure.

FIG. 1 is a diagram schematically showing a battery management apparatus 100 according to an embodiment of the present disclosure. FIG. 2 is a diagram schematically showing an example configuration of a battery pack 1 including the battery management apparatus 100 according to an embodiment of the present disclosure.

Referring to FIGS. 1 and 2, the battery management apparatus 100 according to an embodiment of the present disclosure may include a heating cell 110, a first switch 120, a heating element 130, a second switch 140, and a heating control unit 150.

The heating cell 110 may be configured to be connected to the battery 10 in parallel.

For example, the battery 10 and/or the heating cell 110 may refer to a single independent secondary battery that includes a negative electrode terminal and a positive electrode terminal and is physically separable. As another example, the battery 10 and/or the heating cell 110 may refer to a cell assembly in which one or more secondary batteries are connected in series and/or in parallel.

In general, when the temperature of the battery 10 is equal to or lower than a specific temperature, the mobility of lithium ions included in the battery 10 is significantly reduced, so that the battery 10 may not be discharged normally. For example, when the temperature of the battery 10 is about −40° C. or below, the electrolyte is frozen to significantly reduce mobility of the lithium ions, and the voltage of the battery 10 may be close to about 0 V. That is, since the mobility of lithium ions is significantly reduced, the battery 10 may not be charged and discharged.

In the embodiment of FIG. 2, the battery 10 and the heating cell 110 may be connected to each other in parallel.

The first switch 120 may be configured to be connected between the heating cell 110 and a charging and discharging path L on which a current for charging and discharging the battery 10 flows.

Here, the charging and discharging path L may be a path through which a charging current applied to the battery 10 from a load 20 and a discharging current outputted from the battery 10 to the load 20 flow. For example, in the embodiment of FIG. 2, the path connecting a positive electrode P+ of the battery pack 1, the battery 10, and a negative electrode P− of the battery pack 1 may be the charging and discharging path L. The battery 10 may receive a charging current from the load 20 or output a discharging current to the load 20 through the charging and discharging path L.

In the embodiment of FIG. 2, one end of the first switch 120 may be connected to the charging and discharging path L. In addition, the other end of the first switch 120 may be connected to one end of the heating cell 110. Accordingly, the heating cell 110 may be connected to the battery 10 in parallel through the first switch 120 and the charging and discharging path L.

In addition, the first switch 120 may be configured to open and close a path between the charging and discharging path L and the heating cell 110 according to an operation state.

Specifically, the heating cell 110 may be connected to the charging and discharging path L through the first switch 120. Accordingly, the path between the heating cell 110 and the charging and discharging path L may be opened and closed according to the operation state of the first switch 120.

Here, the operation state of the first switch 120 may be a turn-on state or a turn-off state.

For example, if the operation state of the first switch 120 is a turn-on state, the heating cell 110 and the charging and discharging path L may be connected. Conversely, when the operation state of the first switch 120 is a turn-off state, the connection between the heating cell 110 and the charging and discharging path L may be blocked.

For example, in the embodiment of FIG. 2, when the operation state of the first switch 120 is a turn-on state, the heating cell 110 may be charged by the battery 10.

The heating element 130 may be configured to be connected to the heating cell 110 in parallel.

For example, in the embodiment of FIG. 2, one end of the heating element 130 may be connected to one end of the heating cell 110, and the other end of the heating element 130 may be connected to the other end of the heating cell 110.

In addition, the heating element 130 may be configured to increase the temperature of the battery 10 by heating when a current is supplied from the heating cell 110.

Specifically, the heating element 130 may be an element that generates heat when a current flows. For example, any configuration that may generate heat when a current is applied from the heating cell 110, such as a thermoelectric element, a heating resistor or a heating pad, may be applied to the heating element 130 without limitation.

In the embodiment of FIG. 2, the heating element 130 forms a closed circuit with the heating cell 110 to receive a current from the heating cell 110. As the current output from the heating cell 110 passes through the heating element 130, the heating element 130 may be heated to emit heat.

Preferably, inside the battery pack 1, the battery 10 may be provided at a position where the heat generated by the heating element 130 may be conducted. That is, the heat generated by the heating element 130 is conducted to the battery 10, which may increase the temperature of the battery 10.

The second switch 140 may be configured to be connected between the heating element 130 and the heating cell 110.

For example, in the embodiment of FIG. 2, one end of the second switch 140 may be connected to one end of the heating cell 110. In addition, the other end of the second switch 140 may be connected to one end of the heating element 130. That is, the second switch 140 may be connected between the heating cell 110 and the heating element 130. Accordingly, the heating cell 110, the second switch 140 and the heating element 130 may form a closed circuit.

In addition, the second switch 140 may be configured to open and close a path connected to the heating element 130 and the heating cell 110 according to an operation state.

Here, the operation state of the second switch 140 may be a turn-on state or a turn-off state. For example, if the operation state of the second switch 140 is a turn-on state, the path provided with the heating cell 110 and the heating element 130 may be connected. Conversely, when the operation state of the second switch 140 is a turn-off state, the connection between the heating cell 110 and the heating element 130 may be blocked.

In the embodiment of FIG. 2, the path connected to the heating cell 110 and the heating element 130 may be opened and closed according to the operation state of the second switch 140. If the operation state of the second switch 140 is a turn-on state, the heating cell 110 and the heating element 130 may be electrically connected to each other, so that a current output from the heating cell 110 flows to the heating element 130. In this case, the heating element 130 is heated, and the heat generated by the heating element 130 may be conducted to the battery 10.

The heating control unit 150 may be configured to be connected to the first switch 120 and the second switch 140, respectively.

For example, the heating control unit 150 may be connected to the first switch 120 and the second switch 140.

In addition, the heating control unit 150 may be connected between the battery 10 and the first switch 120 and configured to receive a voltage of the battery 10.

Specifically, a voltage sensing line SL of the heating control unit 150 may be connected to the charging and discharging path L between the battery 10 and the first switch 120. In addition, the heating control unit 150 may receive the voltage of the battery 10 through the voltage sensing line SL connected to the charging and discharging path L.

Also, the heating control unit 150 may be configured to control the operation states of the first switch 120 and the second switch 140 according to the input voltage, respectively.

Preferably, the heating control unit 150 may be configured to differently control the operation states of the first switch 120 and the second switch 140 from each other. That is, the heating control unit 150 may differently control the operation states of the first switch 120 and the second switch 140 according to the voltage of the battery 10 received through the voltage sensing line SL.

That is, the heating control unit 150 may control the operation state of the first switch 120 to a turn-on state and control the operation state of the second switch 140 to a turn-off state. In this case, the current output from the battery 10 may be applied to the load 20, so that power is supplied to the load 20. In addition, the current output from the battery 10 may be applied to the heating cell 110 through the first switch 120 to charge the heating cell 110.

In addition, the heating control unit 150 may control the operation state of the first switch 120 to a turn-off state and control the operation state of the second switch 140 to a turn-on state. In this case, the current output from the heating cell 110 may be applied to the heating element 130 through the second switch 140 to heat the heating element 130.

Preferably, in a low temperature situation in which the battery 10 is not normally discharged, the heating control unit 150 may heat the heating element 130 by controlling the operation state of the second switch 140 to a turn-on state based on the voltage of the battery 10. When the temperature of the battery 10 rises due to the heat generated by the heating element 130, the mobility of lithium ions gradually increases, so that the battery 10 may be normally discharged. After that, if the temperature of the battery 10 rises and the battery 10 is normally discharged, the heating control unit 150 may control the operation state of the second switch 140 to a turn-off state to stop heating of the heating element 130. In addition, the control unit may control the operation state of the first switch 120 to a turn-on state to charge the heating cell 110 that is discharged to heat the heating element 130.

In addition, preferably, the heating cell 110 may be configured to contain an electrolyte having a lower freezing point than the electrolyte of the battery 10 so as to operate even in a low-temperature situation. In addition, the surface of the heating cell 110 may be coated with one or more insulating materials, such as Aerogel.

That is, the battery management apparatus 100 according to an embodiment of the present disclosure has an advantage of allowing the battery 10 to operate normally by increasing the temperature of the battery 10 by heating the heating element 130 in an emergency situation where the temperature of the battery 10 is lowered below a specific temperature.

In addition, since the energy required when the heating element 130 is heated may be supplied from the heating cell 110, there is an advantage in that the energy of the battery 10 is not consumed to heat the heating element 130.

The heating control unit 150 may be configured to generate a control signal corresponding to the input voltage.

Specifically, the control signal may be a high-level signal or a low-level signal. Here, the high-level signal may be a signal having a magnitude capable of controlling the operation state of the first switch 120 or the second switch 140 to a turn-on state when being applied to the first switch 120 or the second switch 140. In addition, the low-level signal may be a signal having a size that cannot control the operation state of the first switch 120 or the second switch 140 to a turn-on state even if it is applied to the first switch 120 or the second switch 140.

For example, when the temperature of the battery 10 drops below a specific temperature, the voltage of the battery 10 input through the voltage sensing line SL may be 0 V because the mobility of lithium ions decreases. In this case, the heating control unit 150 may generate a control signal having a magnitude corresponding to 0 V. Since the control signal having a magnitude corresponding to 0 V cannot control the operation state of the first switch 120 or the second switch 140 to a turn-on state even if it is applied to the first switch 120 or the second switch 140, the control signal having a magnitude corresponding to 0 V may be a low-level signal.

Also, the heating control unit 150 may be configured to generate an inversion signal of the control signal.

Specifically, when the generated control signal is a low-level signal, the inversion signal may be a high-level signal. Conversely, when the generated control signal is a high-level signal, the inversion signal may be a low-level signal.

In addition, the heating control unit 150 may be configured to output the control signal to the first switch 120 and output the inversion signal to the second switch 140.

Specifically, since the first switch 120 and the second switch 140 receive a low-level signal or a high-level signal, respectively, the operation state of the first switch 120 and the operation state of the second switch 140 may be differently controlled by the heating control unit 150.

For example, if the operation state of the first switch 120 is a turn-on state, the operation state of the second switch 140 may be a turn-off state. Conversely, if the operation state of the first switch 120 is a turn-off state, the operation state of the second switch 140 may be a turn-on state.

Preferably, the heating element 130 may be configured to generate heat by the current supplied from the heating cell 110, when the operation state of the first switch 120 is controlled to a turn-off state and the operation state of the second switch 140 is controlled to a turn-on state by the heating control unit 150.

In the embodiment of FIG. 2, when the operation state of the first switch 120 is a turn-off state and the operation state of the second switch 140 is a turn-on state, the connection between the heating cell 110 and the charging and discharging path L may be blocked. Meanwhile, the heating cell 110, the second switch 140 and the heating element 130 may form a closed circuit. Accordingly, the current output from the heating cell 110 may be applied to the heating element 130 so that the heating element 130 generates heat.

In the embodiment of FIG. 2, when both the operation states of the first switch 120 and the second switch 140 are a turn-on state, the current output from the heating cell 110 may be applied to the heating element 130 and the load 20.

If the temperature of the battery 10 is equal to or lower than a specific temperature, some of the current output from the heating cell 110 is applied to the load 20 and lost, and thus the heating element 130 may not be quickly heated. In addition, due to the loss of the current, there is a problem in that the energy is consumed too much to heat the heating element 130.

Accordingly, the heating control unit 150 has an advantage of efficiently heating the heating element 130 by differently controlling the operation states of the first switch 120 and the second switch 140 from each other.

Figure 3:
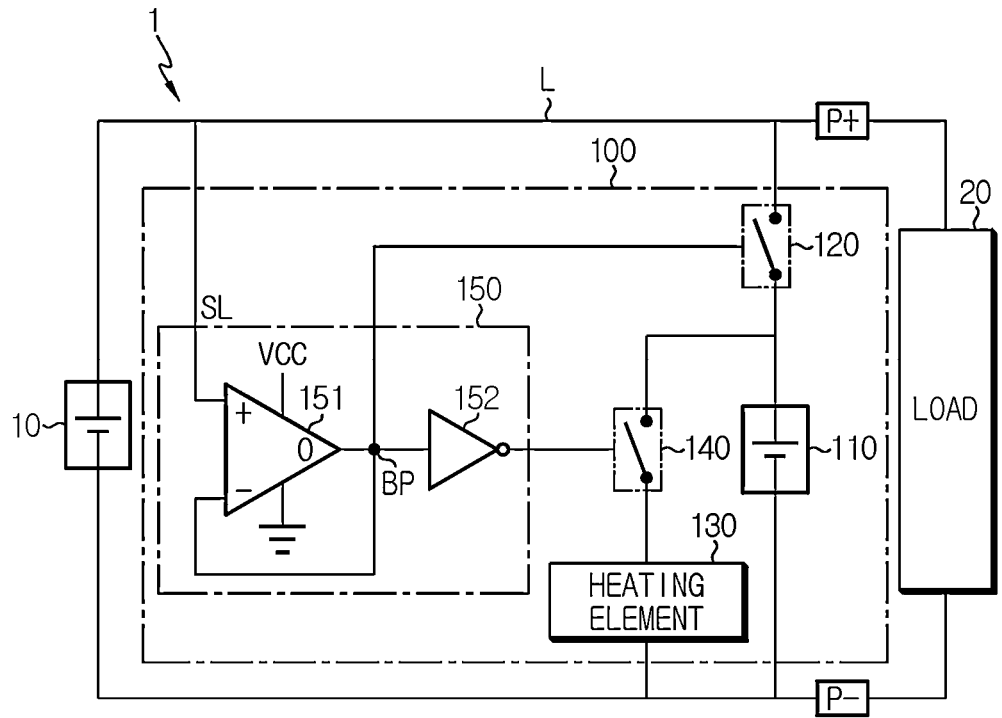
FIG. 3 is a diagram showing the example configuration of the battery pack of FIG. 2 more specifically.

FIG. 3 is a diagram showing the example configuration of the battery pack 1 of FIG. 2 more specifically.

Referring to FIG. 3, the heating control unit 150 may include a buffer 151 and an inverter 152.

The buffer 151 may be configured to receive the voltage of the battery 10 through an input terminal thereof.

In the embodiment of FIG. 3, the voltage sensing line SL may be connected to a first input terminal (+) of the buffer 151. In addition, the buffer 151 may receive the voltage of the battery 10 through the voltage sensing line SL connected to the first input terminal (+).

Also, the buffer 151 may be configured to generate a control signal having the same magnitude as the input voltage.

For example, in the embodiment of FIG. 3, a voltage follower may be applied to the buffer 151. Accordingly, the buffer 151 may generate a control signal having the same magnitude as the voltage of the battery 10 received through the voltage sensing line SL. In addition, the buffer 151 may be operated by receiving a driving voltage of 5 V through a voltage source separate from the battery 10.

In addition, the buffer 151 may be configured to output the generated control signal through an output terminal O thereof.

The inverter 152 may be connected to the output terminal O of the buffer 151 and configured to receive the control signal.

Specifically, the control signal output from the output terminal O of the buffer 151 may be input to the first switch 120 and the inverter 152.

For example, in the embodiment of FIG. 3, the line connected to the output terminal O of the buffer 151 to output the control signal may be branched at a branch point BP into a unit line connected to the first switch 120 and a unit line connected to the inverter 152. Accordingly, the control signal output from the buffer 151 may be input to the inverter 152 as well as the first switch 120.

In addition, the inverter 152 may be configured to generate the inversion signal for the input control signal.

For example, the inverter 152 may be a logic circuit having an input signal and an inverted output. Specifically, when the control signal output from the output terminal O of the buffer 151 is a low-level signal, the inverter 152 may generate a high level signal. Conversely, when the control signal output from the output terminal O of the buffer 151 is a high-level signal, the inverter 152 may generate a low-level signal.

In addition, the inverter 152 may be configured to output the generated inversion signal to the second switch 140.

In the embodiment of FIG. 3, the control signal output from the buffer 151 may be input to the first switch 120 and the inverter 152, and the inversion signal output from the inverter 152 may be input to the second switch 140. Accordingly, the operation states of the first switch 120 and the second switch 140 may be controlled differently from each other.

Meanwhile, the heating control unit 150 may not be configured with a processing module such as a central processing unit (CPU), a microcontroller, a processor or an application-specific integrated circuit (ASIC) known in the art. The above-described processing module may be manufactured to operate normally at an appropriate temperature. Accordingly, in an extremely low-temperature situation where mobility of lithium ions is significantly reduced, the above-described processing module may not operate normally. That is, in an emergency situation where the battery 10 is not normally discharged, the processing module may not operate.

Meanwhile, referring to FIG. 3, the heating control unit 150 may be configured with one or more devices capable of automatically generating and outputting a control signal and an inversion signal to correspond to the voltage of the battery 10 input through the voltage sensing line SL. Accordingly, even in a low temperature situation where the battery 10 is not normally discharged, the heating control unit 150 may automatically control the first switch 120 and the second switch 140 to heat the heating element 130.

That is, the battery management apparatus 100 according to an embodiment of the present disclosure has an advantage of quickly solving an emergency situation where the battery 10 is not normally discharged, by using the heating control unit 150 that is not equipped with a separate processing module.

Figure 4:
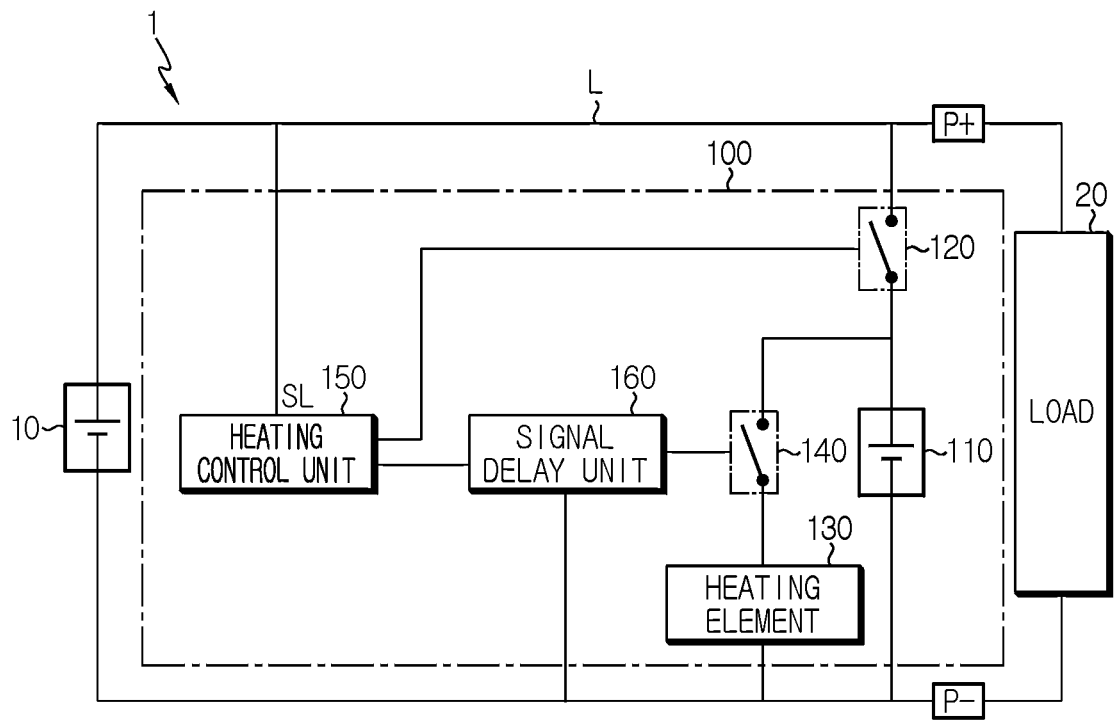
FIG. 4 is a diagram schematically showing an example configuration of a battery pack including a battery management apparatus according to another embodiment of the present disclosure.

FIG. 4 is a diagram schematically showing an example configuration of a battery pack 1 including a battery management apparatus 100 according to another embodiment of the present disclosure.

Referring to FIGS. 1 and 4, the battery management apparatus 100 according to an embodiment of the present disclosure may further include a signal delay unit 160 configured to delay an input time of the inversion signal to the second switch 140 so that the inversion signal is input to the second switch 140 after the control signal is input to the first switch 120.

The signal delay unit 160 may be configured to be provided to a path on which the inversion signal passes between the heating control unit 150 and the second switch 140.

Specifically, the inversion signal output from the heating control unit 150 may pass through the signal delay unit 160 and be input to the second switch 140.

For example, in the embodiment of FIG. 4, the signal delay unit 160 may be provided on the path between the heating control unit 150 and the second switch 140. In addition, the inversion signal may be input from the heating control unit 150 to the second switch 140 through the path on which the signal delay unit 160 is provided.

Also, the signal delay unit 160 may be configured to delay a time at which the inversion signal is input to the second switch 140.

Preferably, the inversion signal may be configured to be input to the second switch 140 after the control signal is input to the first switch 120.

Specifically, the signal delay unit 160 may delay the time at which the inversion signal output from the heating control unit 150 is input to the second switch 140, so that the control signal output from the heating control unit 150 is input to the first switch 120 earlier.

Figure 5:
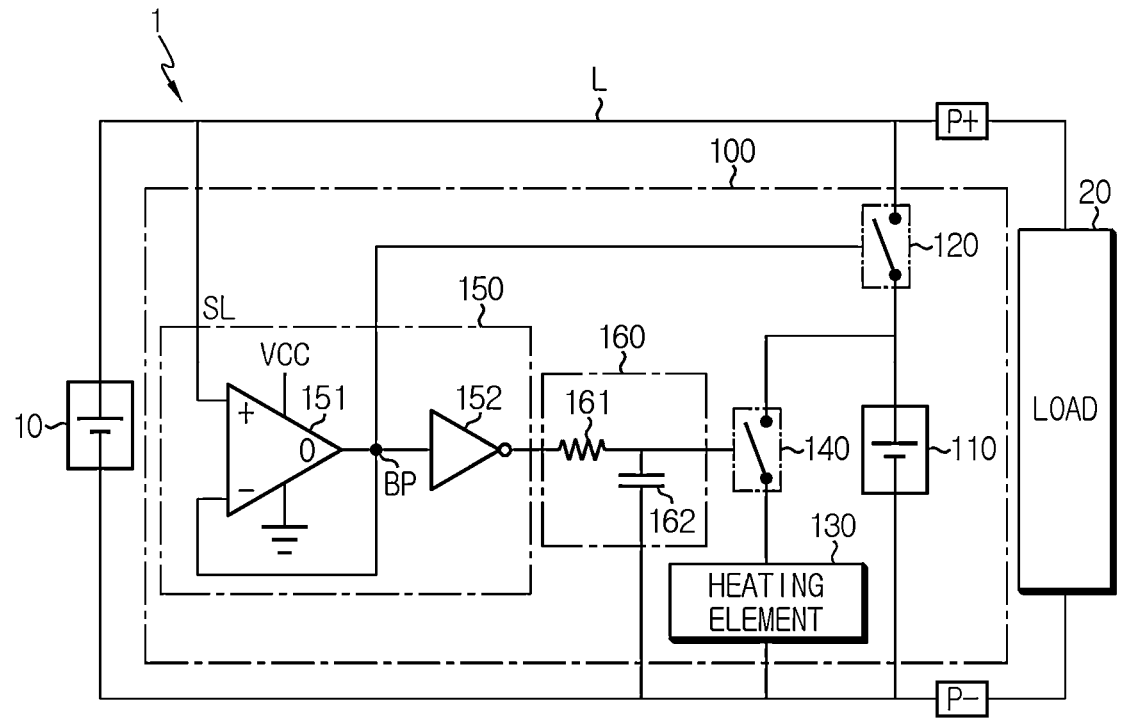
FIG. 5 is a diagram showing the example configuration of the battery pack of FIG. 4 more specifically.

FIG. 5 is a diagram showing the example configuration of the battery pack 1 of FIG. 4 more specifically.

Referring to FIG. 5, the signal delay unit 160 may be configured to include a resistor 161 and a capacitor 162.

The resistor 161 may be configured to be connected between the heating control unit 150 and the second switch 140.

For example, in the embodiment of FIG. 5, one end of the resistor 161 may be connected to the inverter 152. In addition, the other end of the resistor 161 may be connected to the second switch 140. That is, the inversion signal output from the inverter 152 may pass through the resistor 161 and be input to the second switch 140.

The capacitor 162 may be configured to have one end connected between the resistor 161 and the second switch 140 and the other end connected to the ground.

For example, in the embodiment of FIG. 5, one end of the capacitor 162 may be connected to a path between the resistor 161 and the second switch 140. In addition, the other end of the capacitor 162 may be connected to a path between the battery 10 and the negative electrode P− of the battery pack 1 on the charging and discharging path L. That is, in the embodiment of FIG. 5, the other end of the capacitor 162 may be connected to the ground of the charging and discharging path L. Different from the embodiment of FIG. 5, the other end of the capacitor 162 may be connected to a separate ground.

Referring to FIG. 5, the signal delay unit 160 may be configured as an RC filter including the resistor 161 and the capacitor 162. Specifically, the inversion signal output from the inverter 152 may be input to the capacitor 162 after passing through the resistor 161 and may be input to the second switch 140 after the capacitor 162 is charged. That is, the time at which the inversion signal is input to the second switch 140 may be delayed by the amount of time during which the capacitor 162 is charged by the input inversion signal. Meanwhile, since the control signal output from the buffer 151 is input to the first switch 120 without passing through the signal delay unit 160, the inversion signal may be input to the second switch 140 after the control signal is input to the first switch 120.

For example, it is assumed that the temperature of the battery 10 is within a normal temperature range and thus the battery 10 is normally discharged. In this case, the operation state of the first switch 120 may be a turn-on state, and the operation state of the second switch 140 may be a turn-off state. After that, when the temperature of the battery 10 falls below a specific temperature, the control signal output from the heating control unit 150 may be a low-level signal, and the inversion signal may be a high-level signal. If the inversion signal is input to the second switch 140 before the control signal is input to the first switch 120, both the operation states of the first switch 120 and the second switch 140 may be a turned-on state instantaneously. In this case, since a part of the current output from the heating cell 110 is applied to the load 20 and is lost, the heating element 130 may not be quickly heated. In addition, due to the loss of the current, there is a problem in that the energy is consumed too much to heat the heating element 130.

Therefore, the battery management apparatus 100 according to an embodiment of the present disclosure has an advantage of solving the above-mentioned problem by delaying the time at which the inversion signal is input to the second switch 140 so that the operation state of the second switch 140 is switched after the operation state of the first switch 120 is switched.

Figure 6:
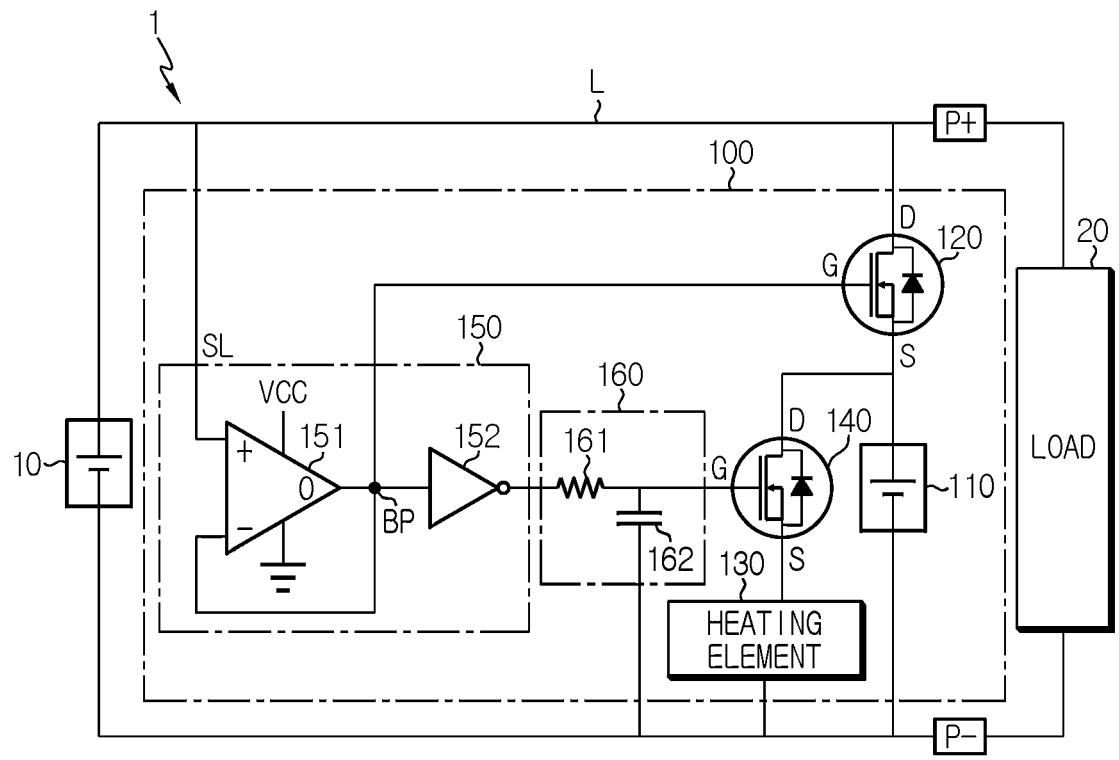
FIG. 6 is a diagram showing the example configuration of the battery pack of FIG. 5 more specifically.

FIG. 6 is a diagram showing the example configuration of the battery pack 1 of FIG. 5 more specifically.

Referring to FIG. 6, an N-channel metal-oxide semiconductor field effect transistor (MOSFET) may be applied to the first switch 120 and the second switch 140.

Specifically, a gate terminal G of the first switch 120 may be connected to the branch point BP, a drain terminal D may be connected to the charging and discharging path L, and a source terminal S may be connected to the heating cell 110. In addition, the gate terminal G of the second switch 140 may be connected between the other end of the resistor 161 and one end of the capacitor 162, the drain terminal D may be connected between the source terminal S of the first switch 120 and the heating cell 110, the source terminal S may be connected to the heating element 130.

In the embodiment of FIG. 6, when the temperature of the battery 10 drops below a specific temperature and the mobility of lithium ions inside the battery 10 is significantly reduced, the operation state of the first switch 120 may be controlled to a turn-off state and the operation state of the second switch 140 may be controlled to a turn-on state. In this case, a minute current may flow from the heating cell 110 to the charging and discharging path L through a body diode included in the first switch 120. However, in general, since the magnitude of the minute current flowing through the body diode included in the MOSFET is so small to be negligible, most of the current output from the heating cell 110 is applied to the heating element 130 so that the heating element 130 may be quickly heated.

Meanwhile, in the embodiment of FIG. 6, a third switch (not shown) may be further provided between the first switch 120 and the charging and discharging path L in order to block the minute current flowing through the body diode included in the first switch 120.

That is, the battery pack 1 may further include a third switch between the first switch 120 and the charging and discharging path L. For example, a drain terminal of the third switch may be connected to the drain terminal D of the first switch 120, a source terminal of the third switch may be connected to the charging and discharging path L, and a gate terminal of the third switch may be connected to the branch point BP. In addition, a body diode included in the third switch may be configured such that a direction toward the first switch 120 is a forward direction.

Specifically, the body diode included in the third switch may be configured such that a direction oriented from the source terminal of the third switch toward the drain terminal is a forward direction.

In addition, the operation state of the third switch may be controlled in the same way as the operation state of the first switch 120. Specifically, when the operation state of the first switch 120 is controlled to a turn-on state by the heating control unit 150, the operation state of the third switch may also be controlled to a turn-on state by the heating control unit 150. In addition, when the operation state of the first switch 120 is controlled to a turn-off state by the heating control unit 150, the operation state of the third switch may also be controlled to a turn-off state by the heating control unit 150.

For example, when the temperature of the battery 10 drops below a specific temperature and the mobility of lithium ions inside the battery 10 is significantly reduced, the operation states of the first switch 120 and the third switch may be controlled to a turn-off state, and the operation state of the second switch 140 may be controlled to a turn-on state. In this case, the minute current flowing from the heating cell 110 to the charging and discharging path L through the body diode included in the first switch 120 may be blocked by the third switch. Accordingly, the entire current output from the heating cell 110 may be applied to the heating element 130 through the second switch 140, so that the heating element 130 may be heated more quickly.

Meanwhile, it should be understood that the first switch 120, the second switch 140 and the third switch are not limited to an N-channel MOSFET, and any switching device capable of opening and closing an installed path, such as a P-channel MOSFET, a FET, a relay or a contactor, may be applied without limitation.

Figure 7:
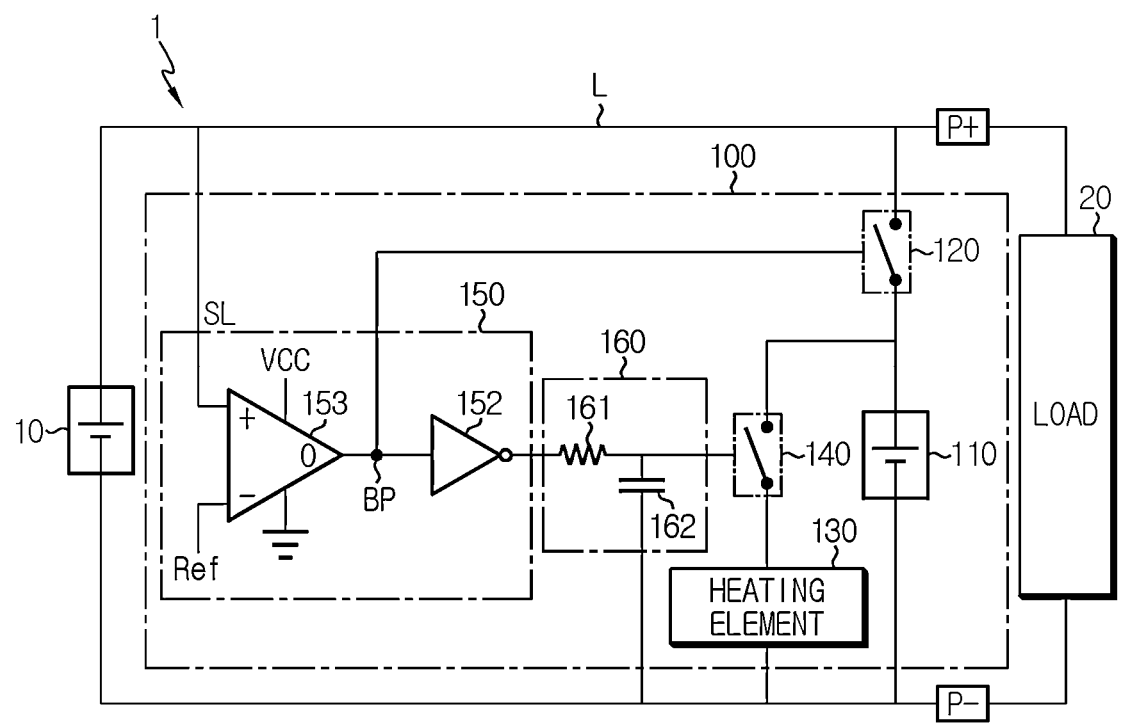
FIG. 7 is a diagram schematically showing an example configuration of a battery pack including a battery management apparatus according to still another embodiment of the present disclosure.

FIG. 7 is a diagram schematically showing an example configuration of a battery pack 1 including a battery management apparatus 100 according to still another embodiment of the present disclosure.

Referring to FIG. 7, the heating control unit 150 may include a comparator 153 and an inverter 152.

Here, the comparator 153 may be configured to compare the magnitude of the first signal input through a first input terminal (+) thereof with the magnitude of the second signal input through a second input terminal (−) thereof and output an output signal corresponding to the comparison result.

The comparator 153 may be configured to receive the voltage of the battery 10 through the first input terminal (+).

That is, the first input terminal (+) of the comparator 153 may be connected to the voltage sensing line SL.

In addition, the comparator 153 may be configured to receive a reference voltage through the second input terminal (−). Here, the reference voltage may be set as a lowest voltage capable of controlling the operation states of the first switch 120 or the second switch 140 to a turn-on state.

In addition, the comparator 153 may be configured to compare the magnitudes of the voltage of the battery 10 and the reference voltage to generate a high-level signal or a low-level signal having different signal levels as the control signal, and output the generated control signal through output terminal O.

Specifically, the comparator 153 may be configured to output a high-level signal when the voltage of the battery 10 is greater than or equal to the reference voltage, and output a low-level signal when the voltage of the battery 10 is less than the reference voltage.

For example, in the embodiment of FIG. 7, when the temperature of the battery 10 gradually decreases so that the temperature of the battery 10 becomes below a specific temperature, even though the voltage of the battery 10 is input to the first switch 120 or the second switch 140, the operation states of the first switch 120 and the second switch 140 may not be controlled to a turn-on state. Therefore, when the voltage of the battery 10 input to the first input terminal (+) of the comparator 153 is less than the reference voltage, the comparator 153 outputs a low-level signal as the control signal, and thus the operation state of the first switch 120 may be controlled to a turn-off state.

The inverter 152 may be connected to the output terminal O of the comparator 153 to receive the control signal and configured to generate the inversion signal for the input control signal and output the generated inversion signal to the second switch 140.

For example, in the embodiment of FIG. 7, when a low-level signal is output as the control signal from the comparator 153, the output low level signal may be input to the inverter 152. In addition, the inverter 152 may generate a high-level signal as the inversion signal and output the generated high-level signal. In addition, the high-level signal output from the inverter 152 may be input to the second switch 140 after passing through the signal delay unit 160. Accordingly, after the operation state of the first switch 120 is converted to a turn-off state first, the operation state of the second switch 140 may be converted to a turn-on state.

In addition, the battery management apparatus 100 according to the present disclosure may be provided to the battery pack 1. That is, the battery pack 1 according to the present disclosure may include the battery management apparatus 100 and one or more batteries 10. In addition, the battery pack 1 may further include electrical equipment (relays, contactors, fuses, etc.) and a case.

For example, referring to FIGS. 2 to 7, the battery pack 1 may include the battery management apparatus 100 and the battery 10. In addition, the positive electrode P+ of the battery pack 1, the battery 10, and the negative electrode P− of the battery pack 1 may form the charging and discharging path L. In addition, the load 20 may be connected to the positive electrode P+ of the battery pack 1 and the negative electrode P− of the battery pack 1.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
10: battery
20: load
100: battery management apparatus
110: heating cell
120: first switch
130: heating element
140: second switch
150: heating control unit
151: buffer
152: inverter
153: comparator
160: signal delay unit
161: resistor
162: capacitor

What is claimed is:

1. A battery management apparatus, comprising:
a heating cell configured to be connected to a battery in parallel;
a first switch connected between the heating cell and a charging and discharging path for carrying a current for charging and discharging the battery, the first switch being configured to open and close a path between the charging and discharging path and the heating cell according to an operation state of the first switch;
a heating element connected to the heating cell in parallel and configured to increase a temperature of the battery by generating heat based on a current supplied from the heating cell;
a second switch connected between the heating element and the heating cell and configured to open and close a path connected between the heating element and the heating cell according to an operation state of the second switch; and
a heating controller connected to the charging and discharging path to receive a voltage of the battery as an input voltage, the heating controller being respectively connected to the first switch and the second switch and being configured to control the respective operation states of the first switch and the second switch according to the input voltage.

2. The battery management apparatus according to claim 1,
wherein the heating controller is further configured to control the respective operation states of the first switch and the second switch differently.

3. The battery management apparatus according to claim 1,
wherein the heating controller is further configured to generate a control signal corresponding to the input voltage, generate an inversion signal of the control signal, output the control signal to the first switch, and output the inversion signal to the second switch.

4. The battery management apparatus according to claim 3,
wherein the heating element is configured to generate heat by the current supplied from the heating cell if the operation state of the first switch is controlled to a turn-off state and the operation state of the second switch is controlled to a turn-on state by the heating controller.

5. The battery management apparatus according to claim 3, further comprising:
a signal delay circuit connected between the heating controller and the second switch and configured to delay a time at which the inversion signal from the heating controller is input to the second switch.

6. The battery management apparatus according to claim 5,
wherein the inversion signal is configured to be input to the second switch after the control signal is input to the first switch.

7. The battery management apparatus according to claim 5, wherein the signal delay circuit includes:
a resistor connected between the heating controller and the second switch; and
a capacitor having one end connected between the resistor and the second switch and the other end connected to the ground.

8. The battery management apparatus according to claim 3, wherein the heating controller includes:
a buffer having an input terminal and an output terminal, the buffer being configured to receive the voltage of the battery through the input terminal as the input voltage, generate the control signal having the same magnitude as the input voltage, and output the generated control signal through the output terminal; and
an inverter connected to the output terminal of the buffer to receive the control signal, the inverter being configured to generate the inversion signal of the input control signal and output the generated inversion signal to the second switch.

9. The battery management apparatus according to claim 3, wherein the heating controller includes:
a comparator having a first input terminal, a second input terminal, and an output terminal, the comparator being configured to receive the voltage of the battery through the first input terminal as the input voltage, receive a reference voltage through the second input terminal, compare the voltage of the battery and the reference voltage to generate a high-level signal or a low-level signal having a different signal level from the high level signal as the control signal, and output the generated control signal through the output terminal; and
an inverter connected to the output terminal of the comparator to receive the control signal, the inverter being configured to generate the inversion signal of the input control signal and output the generated inversion signal to the second switch.

10. A battery pack, comprising the battery management apparatus according to claim 1.

11. The battery management apparatus according to claim 1, further comprising:
a third switch connected between the first switch and the charging and discharging path based on an operation state of the third switch,
wherein the heating controller is further configured to control the operation state of the third switch based on the input voltage.

12. The battery management apparatus according to claim 11, wherein the third switch is a transistor with a drain terminal connected to the first switch, a source terminal connected to the charging and discharging path, and a gate terminal connected to the heating controller.

* * * * *